May 26, 1970 E. A. JANNING, JR 3,514,710

SIGNAL AMPLIFIER WITH DIRECT CURRENT ENERGY SUPPLY AND DYNAMIC RANGE CONTROLLED IN ACCORDANCE WITH COMPOSITE INPUT SIGNAL LEVEL

Filed Nov. 4, 1968

INVENTOR.

EUGENE A. JANNING JR.

BY Charles M. Hogan

Eugene C. Goodale

ATTORNEYS.

United States Patent Office 3,514,710
Patented May 26, 1970

3,514,710

SIGNAL AMPLIFIER WITH DIRECT CURRENT ENERGY SUPPLY AND DYNAMIC RANGE CONTROLLED IN ACCORDANCE WITH COMPOSITE INPUT SIGNAL LEVEL

Eugene A. Janning, Jr., West Chester, Ohio, assignor to Avco Corporation, Cincinnati, Ohio, a corporation of Delaware Filed Nov. 4, 1968, Ser. No. 773,227
Int. Cl. H03g 3/30
U.S. Cl. 330—29 4 Claims

ABSTRACT OF THE DISCLOSURE

This invention provides a circuit exemplified by a radio frequency (R.F.) amplifier in which direct current (D.C.) power is automatically supplied in accordance with prevailing input signal conditions. The circuit disclosed comprises a field effect transistor and associated circuit elements selected and proportioned to have the characteristic that the product of transconductance and the internal resistance of the input or signal generator is greater than 1. This invention exploits the fact that in a field effect transistor (FET) the noise figure is essentially independent of the direct current operating power level while the forward transconductance ($g_m$) of a field effect transistor is a function of the direct current quiescent operating point. The associated parameters are so proportioned that the over-all gain of the amplifier circuit is rendered independent of forward transconductance over wide excursions of the latter. In this circuit signal level is sensed and the resultant control biases cause direct current power to be supplied to the field effect transistor as a function of input signal level. Thus, relatively large direct current power is supplied when necessary and economies of power are automatically accomplished when such relatively large direct current power is not required.

BACKGROUND OF THE INVENTION

The prior art utilizes the expression "dynamic range" as a measure of the ability of a radio frequency signal amplifier to process extremely weak threshold signals without degradation due to the presence of simultaneously applied large interfering signals. Let there be postulated a condition in which a radio receiver including an input radio frequency signal amplifier is tuned to a particular channel and is receiving the desired signal from station A. Let it be assumed that the band width of this amplifier is wider than the over-all band width of the receiver and that a large undesired signal from station B lies within the band width of the radio frequency amplifier. The larger such interfering signal is, the more it degrades the quality of reception of the desired signal. A large interfering signal causes amplifier saturation, for example. The dynamic range of a radio frequency amplifier is accordingly bounded by two limits. The amplifier noise figure is the determinant of the weakest signal that the amplifier is capable of handling. The saturation figure is the determinant of the maximum signal strength that can be handled without substantial degradation. What is desired is the maintenance of large signal handling capability with a high degree of linearity.

Theoretically it is known that the noise figure of a radio frequency amplifier is not necessarily a function of direct current input power. However, the amplifier saturation level is related to such power. It has been customary in the prior art to determine a theoretical minimum direct current input power, in order to meet specifications of dynamic range and noise figure.

In accordance with known practice in the radio frequency amplifier art an amplifier is designed to maintain its signal handling capability under the most adverse conditions reasonably to be anticipated, what are collectively referred to as the "worst case" condition. That is, when wide dynamic range is desired the practice in the art is to provide a large direct current input power and to supply such power under all operating conditions, i.e., for the span of conditions between the optimum case and the most adverse case.

The present invention starts with a realization that large interfering signals are not continuously or even generally present, so that the minimum direct current input power on which the prior art anchors its designs is actually not required except on occasion. Starting with this concept the inventive process proceeds to an appreciation of the desirability of circuit means which so operates that the supply of D.C. power to the radio frequency amplifier is tapered to fit needs and varied in accordance with the signal conditions prevailing at any instant.

In a radio frequency amplifier in accordance with the present invention an increase in composite input signal level is automatically accompanied by an increase in direct current power. Conversely, a decrease in composite signal level is accompanied by a decrease in direct current input power.

The principal objective of the invention is to provide an amplifier in which the direct current power consumption is not greater than that which is necessary to maintain the signal handling capability of the amplifier under existing input signal levels.

This invention involves the further realization that it is necessary for both the noise figure and the gain of the amplifier to be stabilized and maintained substantially constant. Otherwise under the postulate set forth above the increase in direct current power consumption caused by the presence of signal from station B would degrade the handling of the desired signals from station A.

SUMMARY OF THE INVENTION

This invention, therefore, is a signal translating circuit having an active element and associated circuit elements so proportioned and arranged that the noise figure and gain are stabilized and maintained substantially constant over a large range of input signals. Direct current power consumption is minimized by sensing composite input signal level and accordingly controlling the supply of direct current energy to the amplifier. Since the dynamic range is a function of both the large signal capability and the noise figure, it increases with increased direct current power. Thus the amplifier is capable of processing extremely weak signals with no interaction from simultaneously applied large signals.

DESCRIPTION OF THE DRAWINGS

For a better understanding of the invention, together with other and further objects, advantages and capabilities thereof, reference is made to the following description of the drawings, in which.

SPECIFIC DESCRIPTION OF THE INVENTION

To accomplish the objectives of the invention it is necessary that the noise figure and gain of the amplifier remain essentially constant, so that small signals are not adversely affected by an increase in direct current power consumption caused by the contemporaneous presence of a large interfering signal.

In the practical implementation of the principles discussed above, I have selected a field effect transistor (FET), i.e. an active element characterized by a noise figure which is essentially independent of direct current operating power level. This selection satisfies one of two key requirements just mentioned. The other requirement is satisfied by circuitry proportioned to render gain substantially independent of the transconductance of the selected transistor. While the gain or forward transconductance of the field effect transistor, per se, is a function of the direct current quiescent operating point, the circuit is proportioned over-all to overcome this limitation.

Figure 2:
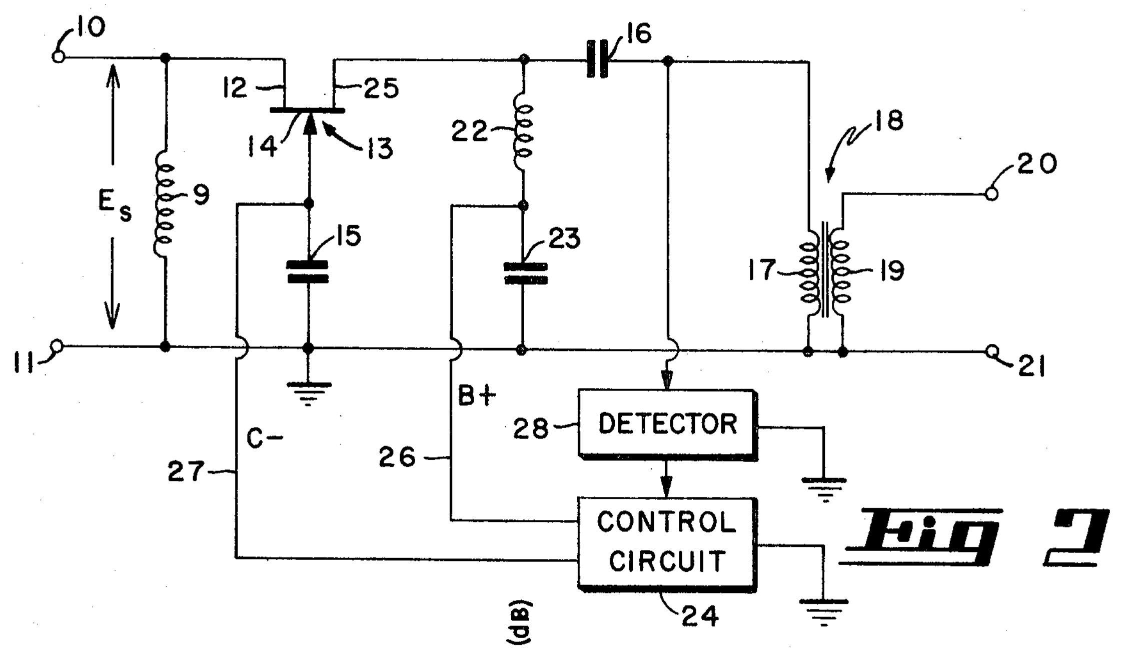
FIG. 2 is a schematic diagram of an illustrative embodiment of radio frequency amplifier circuit in accordance with the invention.

Referring now specifically to FIG. 2, there is shown an amplifier circuit comprising input terminals 10 and 11, terminal 11 being grounded. In shunt with the input terminals is a radio frequency choke 9. Terminal 10 is coupled to the source element 12 of a grounded-gate-arranged field effect transistor 13. The gate 14 of this transistor is radio frequency grounded by capacitor 15 and the drain element is coupled by capacitor 16 to the primary 17 of a broad band transformer 18, the secondary 19 of which is coupled to output terminals 20 and 21. In shunt between the drain element and ground is a series combination of a radio frequency choke 22 and a capacitor 23, which function to keep the high potential lead of the choke at high potential for purposes of radio frequency, the low potential terminal of the choke at ground potential for purposes of radio frequency, and said low potential terminal at the high potential of the control circuit 24 for purposes of direct current drain voltage supply to the drain element 25 of the FET transistor. The elements of FIG. 2 to the left of the element 12 and the ground connection constitute a signal generating source. Element 12 and ground constitute an input circuit for the active device 13. Element 25 and ground constitute the output circuit of the active device. Drain voltage is supplied to the drain element of the transistor from control circuit 24 via B+ line 26, connected to the junction between choke 22 and capacitor 23.

The C− output line 27 of the control circuit 24 is connected to the gate element 14 and ungrounded for direct currents by capacitor 15.

The illustrative embodiment shown is useful as a broad band amplifier over the 2 to 30 mHz. band. The element 13 is an n-channel depletion mode junction FET. Choke 9 serves as a direct current path for the source current of transistor 13.

Gate bias is supplied from the control circuit, which sets the quiescent bias point and therefore the quiescent direct current drain to source current. The broad band transformer 18 is a 200 ohm to 50 ohm transformer and the output terminals 20 and 21 typically "look into" a load of 50 ohms. Additionally, the input terminals 10 and 11 look into a 50 ohm generator, taking into consideration the input resistance of said generator.

The detector 28 and the control circuit 24 constitute means for sensing signal level and developing control biases which cause direct current power to be supplied to the field effect transistor as a function of input circuit level. The elements 22, 23, 16, 18 and 28 of FIG. 2 constitute a load coupled to the transistor output circuit.

Detector 28 is a sampling means and is coupled to the primary of transformer 18, in order to sense the signal level and to derive control biases which function as a measure of composite input signal level. The biases supplied by the output lines 26 and 27 of the control circuit are automatically adjusted by unit 24. That is to say the direct current drain voltage and the drain-to-source direct current are adjusted to a sufficient level to provide the desired amplifier dynamic range.

Figures 3, 4:
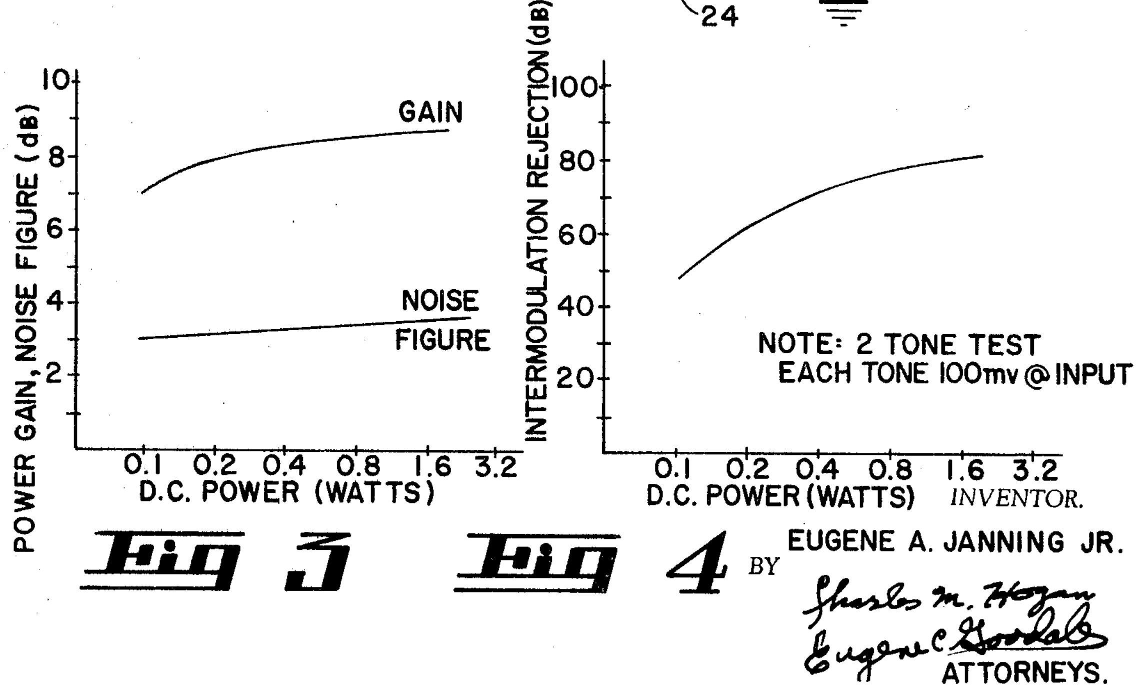
FIGS. 3 and 4 are graphs taken on frameworks of Cartesian coordinates, FIG. 3 illustrating the stabilization of noise figure and gain over a wide range of direct current power supplied, and FIG. 4 illustrating the automatic increase of intermodulation rejection with increase in direct current power, all as accomplished by the invention.

Referring now specifically to FIG. 3, it contains two curves, one showing gain as ordinates and the other showing noise figures, as ordinates, in each case with supplied direct current power as abscissae, all on a framework of Cartesian coordinates. Tests on the FIG. 2 embodiment confirm that the gain and noise figure of the amplifier are maintained essentially constant as the direct current input power is varied from 100 milliwatts to 2 watts.

Referring now to FIG. 4 there is shown, again in a framework of Cartesian coordinates, and again with direct current power as abscissae, a curve of inter-modulation rejection figures (in db) as ordinates. The inter-modulation distortion, a measure of dynamic range, improves by 35 db as input power is varied from 100 milliwatts to 2 watts. In short, dynamic range is increased by an increase in direct current power. However, when the composite signal level is not so high as to require full application of direct current power, substantial economy of power is automatically accomplished. It will be understood that dynamic range is the difference in level, in decibels, between a useful signal just above the threshold and the level of the maximum-amplitude signal that the amplifier can handle simultaneously.

Figure 1:
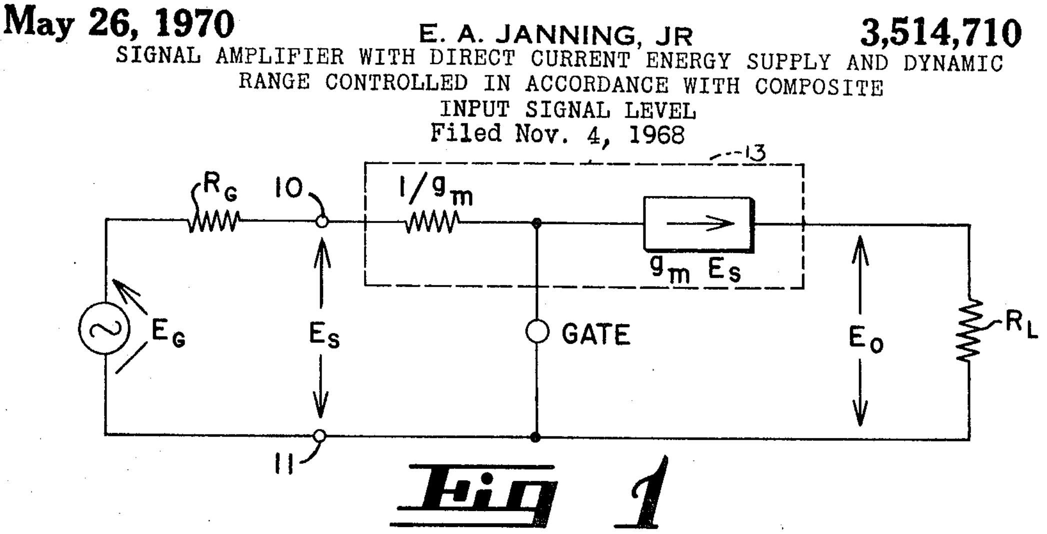
FIG. 1 is a simplified equivalent circuit provided in accordance with the invention and utilized as an aid in explaining the theoretical principles realized and exploited in the invention. $1/g_m$ represents the approximate equivalent input resistance in the common gate mode, and $g_mE_s$ represents the approximate equivalent output current source.

Reference is now made to FIG. 1 for an explanation of the reasons why the above-mentioned advantages are obtained. In the particular embodiment here shown the signal source and its internal resistance are proportioned to look like 50 ohms to the input terminals 10 and 11 (the same reference numerals being utilized in FIGS. 1 and 2 to designate like elements). These elements within the dashed outline 13 in FIG. 1 comprise a field effect transistor, which is selected because of its independence of noise figure with reference to D.C. operating power level. In this particular embodiment the drain electrode 25 is looking out into an impedance of 200 ohms, the expression $R_L$ designating the equivalent load impedance for radio frequency provided by all the elements to the right of the drain element in FIG. 2. In FIG. 1 the other expressions are defined as follows.

$E_G$=voltage level of the generator
$R_G$=internal resistance of the generator
$E_S$=input signal level
$E_O$=output signal level The following mathematical considerations apply to the circuitry of FIG. 1:

$$E_S=E_G\left[\frac{1/g_m}{R_G+1/g_m}\right]=E_G\left[\frac{1}{1+g_mR_G}\right] \quad (1)$$

$$E_O=g_mE_SR_L \quad (2)$$

Substituting (2) into (1), and solving for $E_O/E_G$ $$\text{VOLTAGE GAIN}=E_O/E_G=\frac{g_mR_L}{1+g_mR_G} \quad (3)$$

For $g_mR_G \gg 1$, (3) reduces to $$\text{VOLTAGE GAIN}=R_L/R_G \quad (4)$$

Thus as long as the product $g_mR_G$ remains larger than 1, the amplifier gain is essentially independent of $g_m$ and is equal to the ratio of output resistance to generator resistance.

In the execution of the concepts of this invention the transistor and source are so selected and proportioned that the product of $g_m$ and $R_G$ is greater than 1. The $g_m$ characteristics of various FET devices being known, a desired one is selected and then $R_G$ is so proportioned that this requirement is satisfied.

The insertion power gain of the circuit of FIG. 1 is equal to the ratio of output power, $P_o$, delivered to $R_L$ to available generator power, $P_{av}$;

$$\text{POWER GAIN} = \frac{P_o}{P_{av}} \quad (5)$$

where, $$P_o = \frac{E_O^2}{R_L} \quad (6)$$

The available generator power, $P_{av}$, is the maximum power which the generator is capable of supplying (this ocurs when the generator is match terminated) and is given by the expression;

$$P_{av} = \left[\frac{E_S}{2}\right]^2 \times R_G = \frac{E_S^2}{4R_G} \quad (7)$$

Substituting (6) and (7) into (5);

$$\text{POWER GAIN} = 4\frac{E_O^2 R_G}{E_S^2 R_L} = \frac{4R_G}{R_L}\left[\frac{E_O}{E_S}\right]^2 \quad (8)$$

$E_O/E_S$ is the amplifier voltage gain, which, from Equation 4, was found to equal $R_L/R_G$. Substituting (4) into (8) yields;

$$\text{POWER GAIN} = \frac{4R_G}{R_L}\left[\frac{R_L}{R_G}\right]^2 = \frac{4R_L}{R_G} \quad (9)$$

The power gain expressed in decibels is, thus;

$$\text{POWER GAIN (db)} = 10 \log_{10}\left[\frac{4R_L}{R_G}\right] \quad (10)$$

In the particular circuit illustrated in FIG. 2 the voltage gain is 4 and the power gain is 12 db. While the invention is not limited to any specific parameters I found the following to be suitable in one specific embodiment thereof.

| | |
|---|---|
| Chokes: | |
| 9 | 100 microhenries. |
| 22 | 100 microhenries. |
| Capacitors: | |
| 15 | .01 microfarad. |
| 16 | .01 microfarad. |
| 23 | .01 microfarad. |
| Transistor 13 | Crystalonics Type CP-650. |
| Transformer 18 | Vari-L Type 50200A. |

While there has been shown and described what is at present considered to be the preferred embodiment of the invention, it will be understood by those skilled in the art that various changes and modifications may be made therein without departing from the proper scope of the invention.

Having fully described my invention, I claim:

1. A signal translating circuit having a variable dynamic range comprising:
 a signal generating source,
 a field effect transistor having a control element and an input circuit and an output circuit, said input circuit being coupled to said source, said field effect transistor being characterized by substantial independence of noise figure relative to direct current operating power level,
 a load coupled to said output circuit,
 the internal resistance parameter of said source and the forward transconductance of said field effect transistor being such that their product is greater than 1 so that the gain of the amplifier comprised of said transistor and said load is substantially independent of said transconductance and constant over a range of direct current input power,
 said load including means for sampling the level of signals appearing in said output circuit, and
 means controlled by the sampling means for supplying direct current power to said control element as a positive function of said signal level, whereby a change in signal level is automatically accompanied by a change in dynamic range.

2. A signal translating circuit in accordance with claim 1 in which the field effect transistor is arranged in the grounded gate configuration so that its control element is a gate and its input circuit includes its source and its output circuit includes its drain.

3. A signal translating circuit in accordance with claim 2 in which the means for supplying direct current power is not only coupled to the gate element but also to the drain element.

4. A signal translating circuit in accordance with claim 3, a choke in shunt with the input circuit, the input circuit including a capacitor connected between the gate element and ground, and the means for coupling the direct current supply means to the drain element comprising a shunt connected series combination of inductor and by-pass capacitor included in said load.

References Cited

UNITED STATES PATENTS

| | | | |
|---|---|---|---|
| 3,388,338 | 6/1968 | Austin | 330—35 X |
| 3,449,686 | 6/1969 | Bladen | 330—35 X |

OTHER REFERENCES

Electronics, Oct. 31, 1966, p. 106.

ROY LAKE, Primary Examiner

J. B. MULLINS, Assistant Examiner

U.S. Cl. X.R.

330—38, 134